United States Patent
Izabel et al.

(10) Patent No.: US 9,902,371 B2
(45) Date of Patent: Feb. 27, 2018

(54) DEVICE FOR DISPENSING WINDSHIELD-CLEANING LIQUID FOR A WINDSHIELD WIPER BLADE OF A MOTOR VEHICLE

(71) Applicant: Valeo Systèmes d'Essuyage, Le Mesnil Saint Denis (FR)

(72) Inventors: Vincent Izabel, Chilly Mazarin (FR); Gérald Caillot, Cernay la Ville (FR); Jean-Michel Jarasson, Le Mesnil Saint Denis (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 0 days.

(21) Appl. No.: 14/769,259

(22) PCT Filed: Feb. 27, 2014

(86) PCT No.: PCT/EP2014/053884
§ 371 (c)(1),
(2) Date: Aug. 20, 2015

(87) PCT Pub. No.: WO2014/131859
PCT Pub. Date: Sep. 4, 2014

(65) Prior Publication Data
US 2015/0375715 A1     Dec. 31, 2015

(30) Foreign Application Priority Data
Feb. 28, 2013 (FR) ...................................... 13 51757

(51) Int. Cl.
*B60S 1/34* (2006.01)
*B60S 1/48* (2006.01)
*B60S 1/52* (2006.01)

(52) U.S. Cl.
CPC .............. *B60S 1/3415* (2013.01); *B60S 1/488* (2013.01); *B60S 1/522* (2013.01); *B60S 1/524* (2013.01)

(58) Field of Classification Search
CPC ........ B60S 1/3415; B60S 1/488; B60S 1/522; B60S 1/524
See application file for complete search history.

(56) References Cited

U.S. PATENT DOCUMENTS 4,360,158 A * 11/1982 Bauer ....................... B60S 1/48
                                                          239/284.1
4,815,769 A * 3/1989 Hopperdietzel .......... B05B 1/24
                                                          138/33

(Continued)

FOREIGN PATENT DOCUMENTS

DE     102008051584 A1    4/2010
DE     102012100880 A1    8/2012

(Continued)

OTHER PUBLICATIONS

International Search Report in corresponding application No. PCT/EP2014/053884 dated Apr. 8, 2014 (3 pages).

(Continued)

*Primary Examiner* — Ryan A Reis
(74) *Attorney, Agent, or Firm* — Osha Liang LLP

(57) ABSTRACT

The present invention relates to a device for dispensing a windshield-cleaning liquid for windshield wiper blades of a motor vehicle, comprising: a hydraulic pipe (7, 8) having at least one liquid flow channel (7a, 7b, 8a, 8b); at least one hydraulic coupling (9, 10, 11, 15) for transporting of liquid to said pipe or discharging the liquid from said pipe, characterized in that the dispensing device also comprises at least one non-return valve (20) received in the flow channel (7a, 7b, 8a, 8b) or in a hydraulic coupling (9, 10, 11, 15).

22 Claims, 4 Drawing Sheets

(56) References Cited

U.S. PATENT DOCUMENTS

Figure 3:
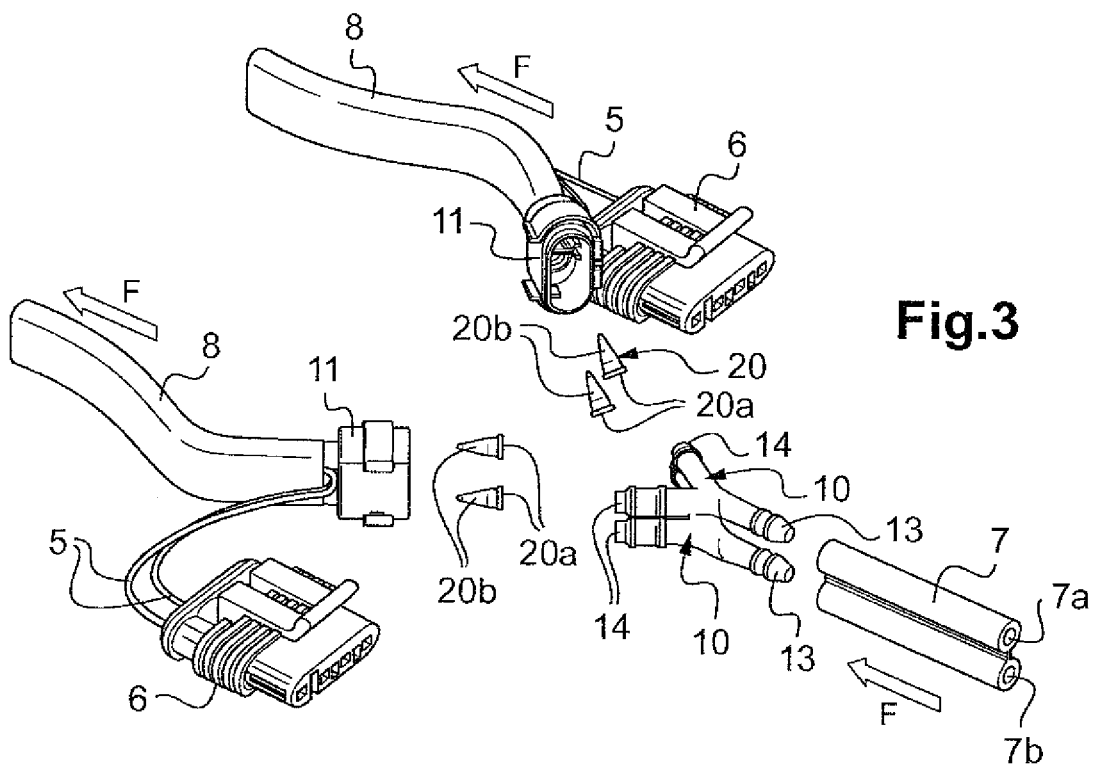

| | | | | |
|---|---|---|---|---|
| 5,819,360 A * | 10/1998 | Fujii | ................... | B60S 1/482 |
| | | | | 15/250.04 |
| 6,460,780 B1 * | 10/2002 | Zimmer | ................... | B60S 1/52 |
| | | | | 239/284.1 |
| 7,093,317 B1 * | 8/2006 | Zimmer | ................... | B60S 1/522 |
| | | | | 15/250.04 |
| 2011/0185531 A1 * | 8/2011 | Egner-Walter | ........ | B60S 1/381 |
| | | | | 15/250.01 |
| 2012/0167327 A1 * | 7/2012 | Kasack | ................... | B60S 1/488 |
| | | | | 15/250.04 |
| 2012/0192375 A1 * | 8/2012 | Cathala | ................... | B60S 1/488 |
| | | | | 15/250.02 |

FOREIGN PATENT DOCUMENTS

| | | |
|---|---|---|
| FR | 2297155 A1 | 8/1976 |
| FR | 2 950 844 A1 | 4/2011 |
| FR | 2967955 A1 | 6/2012 |
| JP | S62-261798 A | 11/1987 |
| JP | H4-116267 U | 10/1992 |
| JP | H06-63451 U | 9/1994 |
| JP | H11-063345 A | 3/1999 |
| JP | H11-063346 A | 3/1999 |
| JP | 2002-540000 A | 11/2002 |
| WO | 2000/056583 A1 | 9/2000 |
| WO | 2011042319 A1 | 4/2011 |
| WO | 2012041581 A1 | 4/2012 |

OTHER PUBLICATIONS

Notification of Reason for Rejection issued in corresponding Japanese Patent Application No. 2015-559503, dated Dec. 15, 2017 (8 pages).

* cited by examiner

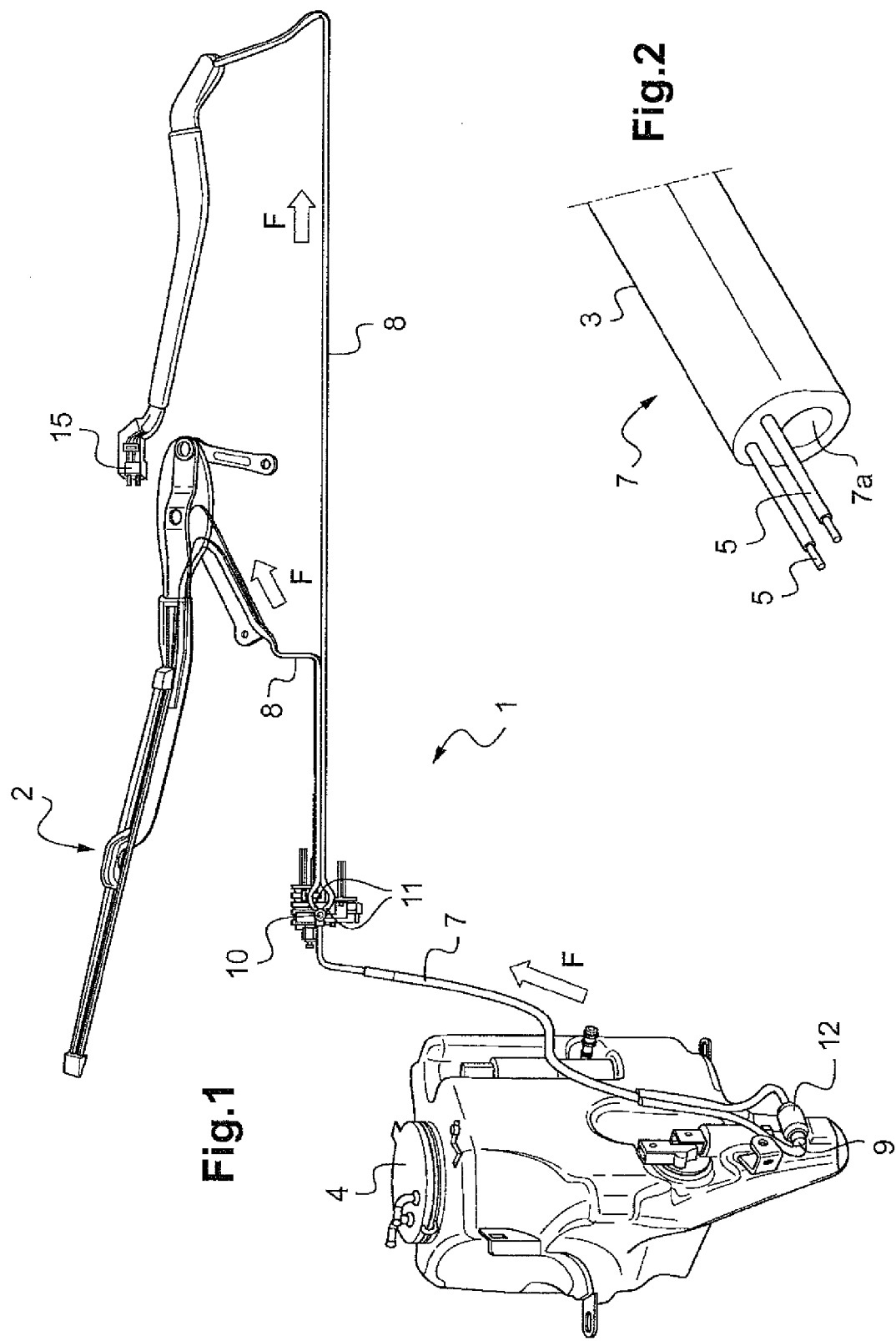

DEVICE FOR DISPENSING WINDSHIELD-CLEANING LIQUID FOR A WINDSHIELD WIPER BLADE OF A MOTOR VEHICLE

The present invention relates to a device for distributing windshield-washing liquid for a windshield wiper of a motor vehicle.

The windshield wiper includes one or more spray manifolds provided with one or a multitude of pressurized spray nozzles or orifices enabling distribution of the windshield-washing liquid onto the glazed surface of the vehicle. The nozzles are fed with windshield-washing liquid contained in a tank by means of a pump.

The distribution device generally includes a main hydraulic pipe connected to a windshield-washing liquid pump of the motor vehicle and two secondary hydraulic pipes connected to the windshield wipers. The main hydraulic pipe and the secondary hydraulic pipes include respective sleeves including at least one circulation channel for circulation of the windshield-washing liquid. The main and secondary hydraulic pipes are connected together by a branch connector notably enabling detachment of the secondary hydraulic pipes connected to the windshield wipers to replace them.

In some distribution devices the branch connector consists of a check valve to prevent any return of liquid from the windshield wipers toward the pump. Such a connector has the drawback of being bulky.

One of the objects of the present invention is to propose a device for distributing windshield-washing liquid for a windshield wiper of a motor vehicle improved by a simplified and more compact device.

To this end, the present invention consists in a windshield-washing liquid distribution device for motor vehicle windshield wipers, including:
- a hydraulic pipe including at least one liquid circulation channel,
- at least one hydraulic connector for feeding liquid to the pipe or evacuating liquid from the pipe,
  - characterized in that the distribution device also includes at least one check valve received in a circulation channel or in a hydraulic connector.

The hydraulic connection is therefore simplified and made more compact.

More particularly, the distribution device may include:
- a main hydraulic pipe including at least one circulation channel,
- two secondary hydraulic pipes respectively including at least one circulation channel, and
- at least one hydraulic connector for connecting the circulation channels of the hydraulic pipes.

The main hydraulic pipe is preferably connected to a windshield-washing liquid pump of the motor vehicle and the secondary hydraulic pipes are preferably connected to a respective windshield wiper.

In accordance with a first embodiment, the check valve is at least partly received in a barb of a hydraulic connector, said barb being received in a circulation channel.

In accordance with a first example, the check valve is inserted in a barb of an adapter, said barb being inserted in a circulation channel of the secondary hydraulic pipe, said adapter forming a hydraulic connector for the connection of at least one branch connector with a circulation channel of a secondary hydraulic pipe. Given that a check valve is received in the barbs of the adapter of each secondary hydraulic pipe, it is certain that the windshield-washing liquid will not feed back from one secondary hydraulic pipe to the other one.

In accordance with a second example, the check valve is inserted at the inlet of a barb of a male connector, said barb inlet being inserted in a circulation channel of the secondary hydraulic pipe, the male connector forming a hydraulic connector for the connection of a windshield wiper with at least one circulation channel of a secondary hydraulic pipe. Given that a check valve is received in the circulation channel of each secondary hydraulic pipe, it is certain that the windshield-washing liquid will not feed back from one secondary hydraulic pipe to the other one. Moreover, the check valves are mounted near the windshield wipers. The circulation channels of the secondary hydraulic pipes containing windshield-washing liquid as far as the check valves are therefore filled with windshield-washing liquid as close as possible to the windshield wipers. This results in a saving of time for spraying the windshield-washing liquid onto the windshield of the motor vehicle.

In accordance with a second embodiment, the check valve is received directly in the circulation channel.

In accordance with a first example, the check valve is inserted in the circulation channel, at the inlet of the secondary hydraulic pipe, on the side intended to be connected to a branch connector connecting the circulation channels of the main hydraulic pipe to the circulation channels of the secondary hydraulic pipes. Given that a check valve is received in the circulation channel of each secondary hydraulic pipe, it is certain that the windshield-washing liquid will not feed back from one secondary hydraulic pipe to the other one.

In accordance with a second example, the check valve is inserted in the circulation channel, at the outlet of the secondary hydraulic pipe, on the upstream side of the end of the secondary hydraulic pipe intended to be connected to a male connector connecting the circulation channel to a windshield wiper. Given that a check valve is received in the circulation channel of each secondary hydraulic pipe, it is certain that the windshield-washing liquid will not feed back from one secondary hydraulic pipe to the other one. Moreover, the check valves are mounted as near the windshield wipers as possible. The circulation channels of the secondary hydraulic pipes containing windshield-washing liquid as far as the check valves are therefore filled with windshield-washing liquid as close as possible to the windshield wipers. This results in a saving of time for spraying the windshield washing liquid onto the windshield of the motor vehicle.

In accordance with a third example, the check valve is inserted in the circulation channel, at the outlet of the main hydraulic pipe, on the side intended to be connected to a branch connector connecting the circulation channels of the main hydraulic pipe to the circulation channels of the secondary hydraulic pipes. This solution makes it possible to use check valves of larger flow section than check valves received in the circulation channels of the secondary hydraulic pipes. In fact, the main hydraulic pipe generally includes circulation channels having sections of greater diameter than the circulation channels of the secondary hydraulic pipes.

The distribution device may include a immobilizing member cooperating with the circulation channel and the check valve to immobilize the check valve in the circulation channel.

The check valve is of the "duckbill" type, for example. This type of check valve has the advantage of being simple, robust, easy to arrange and to heat.

The check valve is for example a force-fit in the circulation channel or in a barb of the hydraulic connector.

In accordance with one embodiment, the main hydraulic pipe and/or the secondary hydraulic pipes include heating conductors. In operation, the heating conductors heat the sleeve and therefore the circulation channels which heat the check valves without any additional heating device being required. Similarly, the sleeve in turn heats the barb of the hydraulic connector inserted in the circulation channel. The check valves inserted therein are then heated by the hydraulic connector. The check valves inserted directly in the circulation channels or in the barbs of the hydraulic connectors therefore benefit from the proximity of the heating conductors to be heated.

In accordance with one embodiment, the main and secondary hydraulic pipes respectively include two liquid circulation channels. For example, the heating conductors extend in the sleeve of the main or secondary hydraulic pipe and pass between the two circulation channels.

Figure 4:
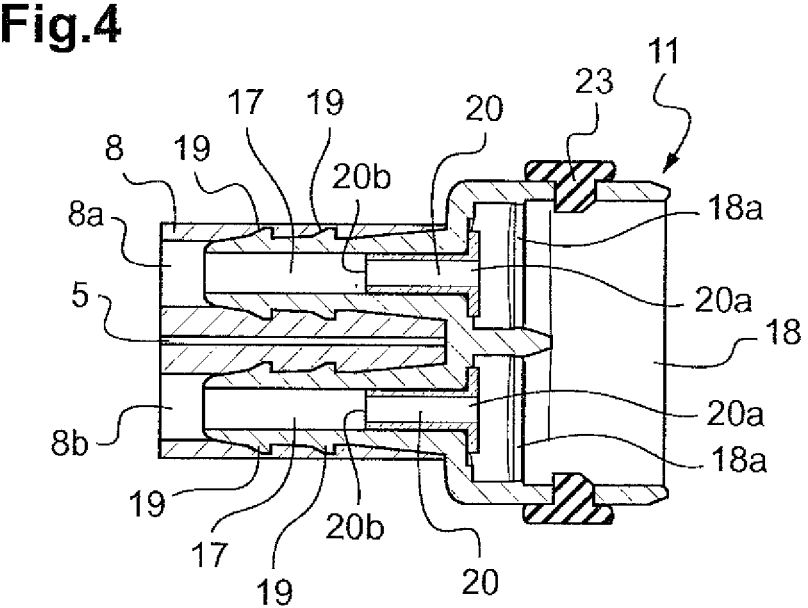
Figure 5:
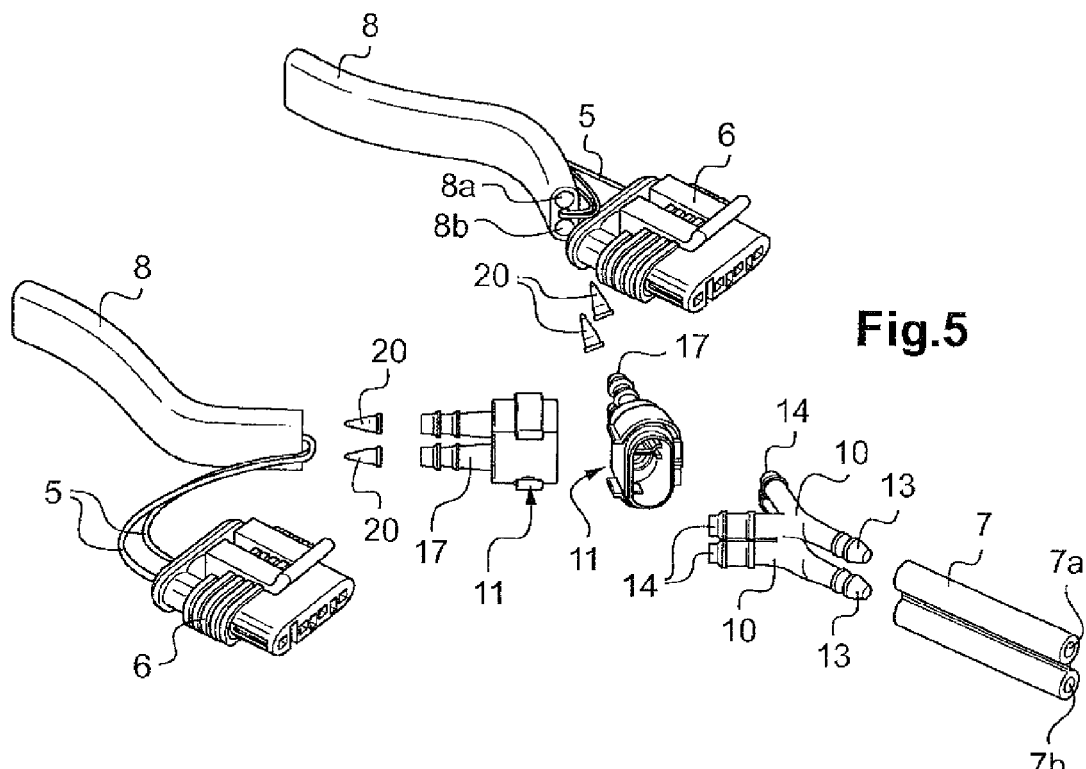
Figure 6:
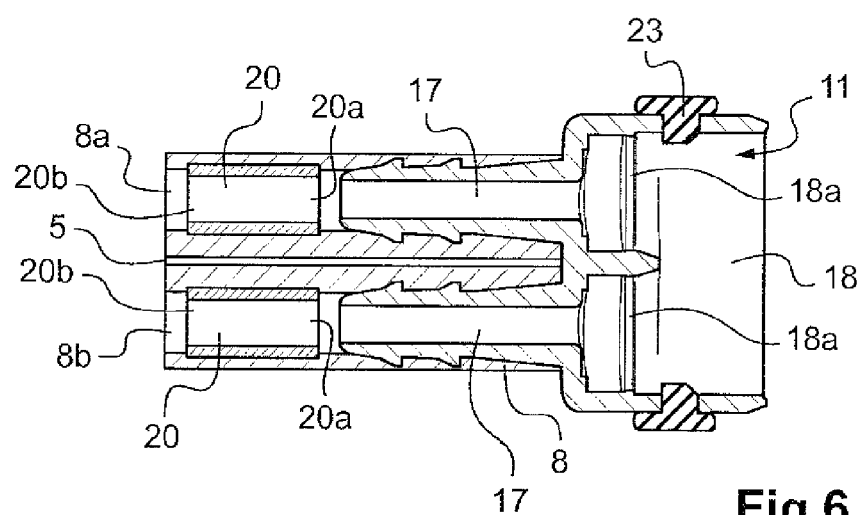
Figure 7:
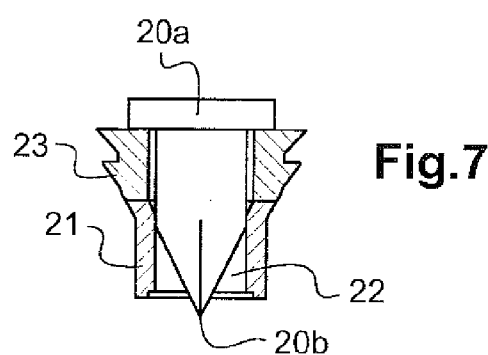
Figure 8:
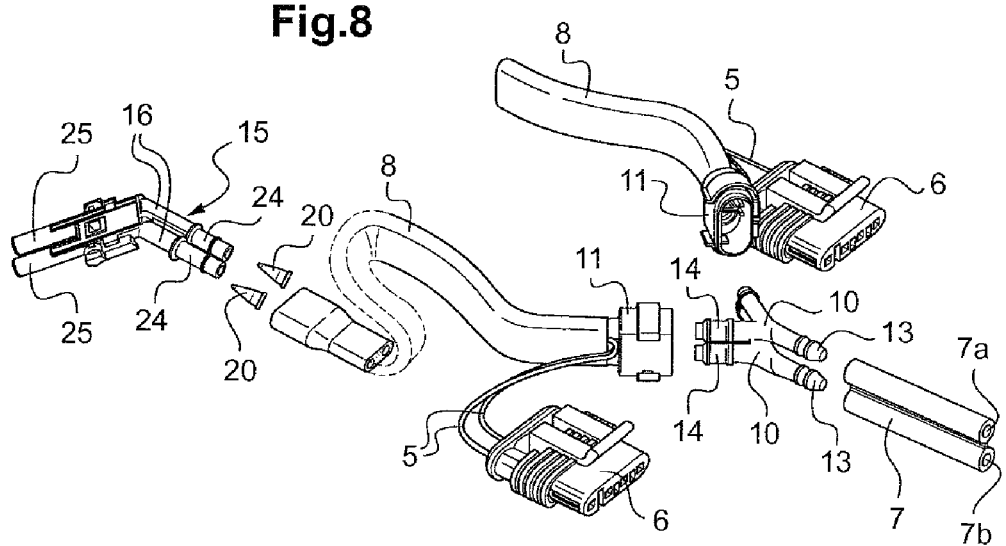
Figure 9:
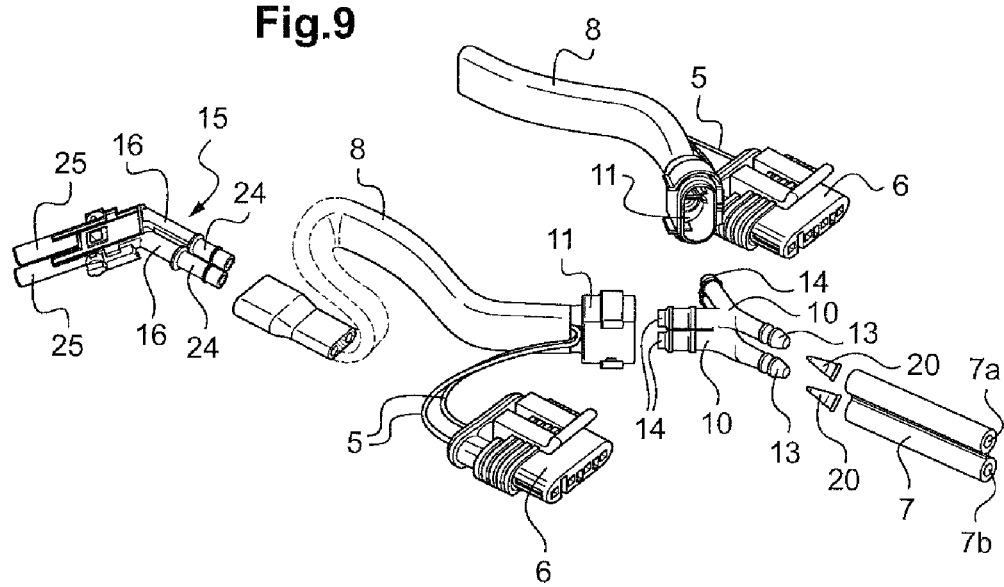

Other objects, features and advantages of the invention will emerge from the following description given by way of nonlimiting example with reference to the appended drawings, in which:

FIG. 1 is a diagrammatic view of elements of a device for distributing windshield-washing liquid for a windshield wiper of a motor vehicle, FIG. 2 shows one example of a main hydraulic pipe for a "heating" and "single-manifold" distribution device, FIG. 3 is a diagrammatic view of elements of a first embodiment of a windshield-washing liquid distribution device in a disassembled state, FIG. 4 is a sectional view of a detail of a windshield-washing liquid distribution device similar to that from FIG. 3 in an assembled state, FIG. 5 is a diagrammatic view of elements of a second embodiment of a windshield-washing liquid distribution device for motor vehicle windshield wipers in a disassembled state, FIG. 6 is a sectional view of a detail of a windshield-washing liquid distribution device similar to that from FIG. 5 in an assembled state, FIG. 7 is a sectional view of an example of a check valve and an immobilizing member when assembled together, FIG. 8 is a diagrammatic view of elements of a third embodiment of a windshield-washing liquid distribution device for motor vehicle windshield wipers in a disassembled state, and FIG. 9 is a diagrammatic view of elements of a fourth embodiment of a windshield-washing liquid distribution device in a disassembled state.

In these figures, identical elements bear the same reference numbers.

FIG. 1 is a diagrammatic general view of the elements of a windshield-washing liquid distribution device 1 for motor vehicle windshield wipers 2 (only one wiper is shown in FIG. 1).

The windshield-washing liquid distribution device 1 shown is suitable for windshield wipers with two spray manifolds (also known as dual manifold distribution devices) or for windshield wipers with only one spray manifold (or single-manifold distribution devices). The windshield wipers with two manifolds include a sprayer manifold on each side of the arm of the windshield wiper, each manifold extending along the longitudinal direction of the wiper. The windshield-washing liquid is therefore sent only to the "front" part of the wiper, i.e. the windshield washing liquid is sent to the spray manifold situated on the side on which the windshield wiper arm is advancing, during a rising phase of wiping, and on the other side during the descending phase of wiping. This arrangement makes it possible to wipe the windshield-washing liquid instantaneously after it is deposited on the glazed surface, thus eliminating any interval during which the vision of the driver might have been impeded, at the same time as advantageously maintaining the necessary washing/cleaning performance.

The windshield-washing liquid distribution device 1 includes a main hydraulic pipe 7, two secondary hydraulic pipes 8 and at least one hydraulic connector 9, 10, 11, 15.

As can be seen in an embodiment shown in FIG. 2, the main hydraulic pipe 7 includes a sleeve 3 which includes at least one circulation channel 7a for the circulation of the windshield-washing liquid. The sleeve 3 is made from a flexible material, for example rubber. The circulation channel 7a is connected to a windshield-washing liquid pump 12 of the motor vehicle, the pump 12 being itself connected to a tank 4 (FIG. 1).

In the dual manifold embodiment, the main hydraulic pipe 7 includes two circulation channels 7a, 7b (FIGS. 1 and 3).

The secondary hydraulic pipes 8 embody the same design principle (see for example the FIG. 4 sectional view). They respectively include at least one circulation channel 8a, 8b and are intended to be connected to a respective windshield wiper 2.

In operation, the windshield-washing liquid circulates from the tank 4 toward the windshield wipers 2 as shown by the arrows F in FIG. 1.

In one particular, so-called "heating", embodiment, the main hydraulic pipe 7 and/or the secondary hydraulic pipes 8 also include at least one heating conductor 5, for example buried in the mass of the sleeve 3 (FIG. 2). The heating conductor 5 is introduced during extrusion of the sleeve 3, for example. The heating conductor 5 is a resistive wire that heats the sleeve 3 and therefore heats the windshield-washing liquid circulating in the circulation channel. The windshield-washing liquid is therefore heated when the outside temperature is too low so that there are no obstacles to the flow of the windshield-washing liquid in the circulation channel.

The heating conductors 5 of the secondary hydraulic pipes 8 are connected to an electrical connector 6 to be supplied with power and to be easily connected and disconnected (FIG. 3).

In the dual manifold embodiment, the heating conductors 5 extend in the sleeve 3 of the main hydraulic pipe 7 and/or the secondary hydraulic pipes 8, for example between the two circulation channels (FIG. 4).

Among the hydraulic connectors of the distribution device 1 there are notably seen the branch connector 10, the adapter 11, the male liquid connector 15 and the pump connector 9.

The branch connector 10 enables connection of at least one circulation channel 7a, 7b of the main hydraulic pipe 7 to at least two circulation channels 8a, 8b of a respective secondary hydraulic pipe 8, as shown in the FIG. 3 example.

The branch connector 10 is for example a tubular "T" or "Y" element enabling branching of the windshield-washing liquid from the main hydraulic pipe 7 to the two secondary hydraulic pipes 8. To be more precise, the branch connector 10 includes at the inlet a barb 13 connected to a circulation channel 7a of the main hydraulic pipe 7 and at the outlet two barbs 14 respectively connected to a circulation channel 8a of a secondary hydraulic pipe 8.

The barbs 13, 14 include for example male tubular portions having at least one set of frustoconical annular teeth enabling insertion and retention in the respective circulation channel of the sleeve 3 by deformation.

In the dual manifold embodiment, the distribution device includes two branch connectors 10, for example superposed one above the other so that the barbs 13, 14 are substantially parallel to each other. The two branch connectors 10 are independent of each other but may be in one piece (FIG. 1) or separate.

The main hydraulic pipe 7 and the branch connector(s) 10 are disposed under the hood of the motor vehicle, i.e. in the engine compartment, while the secondary hydraulic pipes 8 are mainly arranged on the outside.

The adapter 11 is another type of hydraulic connector. The adapters 11 make it possible to facilitate the connection of at least one branch connector 10 with at least one circulation channel 8a, 8b of a secondary hydraulic pipe 8 (FIGS. 3 and 4).

The male connector 15 is another type of hydraulic connector (FIGS. 8 and 9). The male connector 15 enables connection to a windshield wiper 2 of at least one circulation channel 8a, 8b of a secondary hydraulic pipe 8.

The pump connector 9 is another type of hydraulic connector (FIG. 1).

The distribution device also includes at least one separate check valve 20 received in a circulation channel 7a, 7b, 8a, 8b of a main hydraulic pipe 7 or secondary hydraulic pipe 8 or in a hydraulic connector 9, 10, 11, 15. The hydraulic connection is therefore simplified and made more compact.

The check valve 20 enables the passage of the windshield-washing liquid pumped in the circulation direction going from the windshield-washing liquid pump 12 to a spray manifold of the wiper and blocking of the return of the flow of liquid pumped in the other direction, i.e. from the wipers 2 toward the pump 12. The check valve 20 therefore prevents any return of liquid toward the pump 12, notably in the phase of stopping distribution of liquid in a circulation channel.

In accordance with a first embodiment shown in FIGS. 3 and 4, the check valve 20 is inserted in a barb 17 of the adapter 11.

Seen more clearly in the FIG. 4 sectional view, the adapter 11 includes at the outlet at least one barb 17 conformed to be inserted in a circulation channel 8a, 8b of a secondary hydraulic pipe 8 and an inlet housing 18 cooperating with a barb 14 of a branch connector 10. For example, the inlet housing 18 includes at least one cavity 18a conformed to cooperate through elastic nesting with the barb 14 of the branch connector 10.

The barb 17 of the adapter 11 has a tubular internal section and may include radial ribs 19 on the external periphery to facilitate its insertion and retention in the circulation channel 8a, 8b through deformation of the sleeve 3.

The adapter 11 may further include means for locking the connection, formed for example by a clip 23 fitting around the exterior walls of the inlet housing 18.

The adapter 11 therefore improves the sealing of the connection between the branch connector 10 and the secondary hydraulic pipes 8 and provides tactile feedback perceptible by the operative guaranteeing correct mounting.

The check valve 20 is a force fit in the barb 17, for example. To continue to circulate, the windshield-washing liquid is therefore forced to pass through the check valve 20 at the level of the adapter 11.

In the dual manifold embodiment, the distribution device therefore includes four check valves 20, each check valve 20 being received in a barb 17 of an adapter 11. Given that a check valve 20 is received in each barb 17 of the adapter of each secondary hydraulic pipe 8 it is certain that the windshield-washing liquid cannot return from the secondary hydraulic pipes 8 when distribution of the liquid is stopped.

The check valves 20 are of the "duckbill" type, for example. The duckbill type check valves 20 include a valve body having a cylindrical end 20a conformed to the circulation channel 8a, 8b to be sure that the windshield-washing liquid is forced to pass through the check valve 20 and a flattened duckbill shape end 20b.

The duckbill end 20b is oriented in the downstream direction relative to the direction of flow of the windshield-washing liquid from the pump 12 toward the wipers 2 (see arrows F in FIG. 1). When the windshield-washing liquid is pumped through the check valve 20 the duckbill flattened end 20b opens up to allow the windshield-washing liquid to pass through. When the windshield-washing liquid is no longer being pumped, the pressure falls and the duckbill end 20b returns to its flattened shape preventing the pumped windshield-washing liquid flowing back toward the pump.

The check valves 20 are made from an elastomer material, for example.

This type of check valve has the advantage of being simple, robust, easy to arrange and to heat.

In the heated embodiment, in operation, the heating conductors 5 heat the sleeve which in turn heats the barbs 17 of the adapters 11 inserted in the circulation channels 8a, 8b. The check valves 20 are then heated by the adapters 11 without any additional heating devices being required. The check valves 20 therefore benefit from the proximity of the heating conductors 5 to be heated.

In accordance with a second embodiment shown in FIGS. 5 and 6, the check valves 20 are received directly in the circulation channel 8a, 8b of the secondary hydraulic pipes 8.

In this first example, the check valve 20 is inserted in the inlet of the circulation channel 8a, 8b of the secondary hydraulic pipe 8, on the side intended to be connected to a branch connector 10, downstream of the latter.

The check valve 20 is entirely housed in the circulation channel 8a, 8b of the secondary hydraulic pipe 8 so that, to continue to circulate, the windshield-washing liquid is forced to pass through.

In the dual manifold embodiment, the distribution device therefore includes four check valves, each check valve being received in a respective circulation channel 8a, 8b. It is therefore certain that the windshield-washing liquid cannot return from the secondary hydraulic pipes 8 when distribution of the liquid is stopped.

The check valve 20 is for example a force-fit in the circulation channel 8a, 8b. As before, the check valves 20 are for example of the duckbill type.

The distribution device may also include a immobilizing member 21 cooperating with the circulation channel 8a, 8b and the check valve 20 to immobilize the check valve 20 in the circulation channel 8a, 8b.

In accordance with an embodiment shown in FIG. 7, the immobilizing member 21 includes an internal housing 22 to receive the check valve 20 and annular blocking teeth 23 at the external periphery. The blocking teeth 23 make it possible to facilitate insertion and retention of the check valve 20 in the circulation channel 8a, 8b. As well as blocking immobilizing it in the pipe, the immobilizing member 21 facilitates mounting the check valve 20 in the circulation channel 8a, 8b.

The immobilizing member 21 is made in one piece from a plastic material, for example. In the heated embodiment, the immobilizing member 21 is made from a thermally conductive material, for example. In operation, the heating conductors 5 of the secondary hydraulic pipe 8 heat the sleeve 3 which in turn heats the immobilizing member 21 and the check valves 20 without any additional heating device being required. The check valves 20 therefore benefit from the proximity of the heating conductors 5 to be heated themselves.

In accordance with another embodiment that is not shown, the immobilizing member is in one piece with the check valve 20. In accordance with other embodiments, the immobilizing member includes a counter-piece or stop mounted in the circulation channel 8a, 8b to immobilize the check valve 20 in the circulation channel.

In accordance with a second embodiment, the check valve 20 is inserted at the outlet of the circulation channel 8a, 8b of the secondary hydraulic pipe 8, on the upstream side of the end of the secondary hydraulic pipe 8 intended to be connected to the male connector 15 (FIG. 8).

As in the preceding example, it is certain that the windshield-washing liquid cannot return from the secondary hydraulic pipes 8 when the distribution of the liquid is stopped.

Moreover, in this embodiment, the check valves 20 are mounted nearer the windshield wipers. The circulation channels 8a, 8b of the secondary hydraulic pipes 8 therefore contain the windshield-washing liquid as far as the check valves 20 and therefore as close as possible to the windshield wipers 2. This results in a time saving for the spraying of the windshield-washing liquid onto the windshield of the motor vehicle.

The check valve 20 is for example a force fit in the circulation channel 8a, 8b. They are of the duckbill type for example and a immobilizing member 21 may cooperate with the circulation channel 8a, 8b to retain the check valve 20.

Moreover, in the heated embodiment, the heating conductors 5 of the secondary hydraulic pipe 8 heat the sleeve 3 which in turn heats the check valves 20 housed in the circulation channels 8a, 8b.

In accordance with a third embodiment shown in FIG. 9, the check valve 20 is inserted at the outlet of the circulation channel 7a, 7b of the main hydraulic pipe 7, on the side intended to be connected to the branch connector 10.

The check valve 20 is for example a force fit in the circulation channel 7a, 7b. It is for example of the duckbill type and an immobilizing member 21 may cooperate with the circulation channel 7a, 7b to retain the check valve 20.

In the heated embodiment, the heating conductors 5 of the main hydraulic pipe 7 heat the sleeve 3 which in turn heats directly the check valves 20 housed in the circulation channels 7a, 7b.

This solution uses check valves of greater flow section than the check valves received in the circulation channels 8a, 8b of the secondary hydraulic pipes 8. In fact, the main hydraulic pipe 7 includes circulation channels 7a, 7b having sections of greater diameter than the circulation channels 8a, 8b of the secondary hydraulic pipes 8.

In accordance with a third embodiment (FIG. 8), the check valve 20 is inserted at the inlet 24 of a barb 16 of a male connector 15.

The male connector 15 includes at least one barb 16 for the circulation of the windshield-washing liquid, the inlet 24 of which is inserted in a circulation channel 8a, 8b of a secondary hydraulic pipe 8 and the outlet 25 of which is inserted in a complementary female liquid connector of the windshield wiper. The barb 16 may be angled.

In the heated embodiment, the male connector 15 may be heated, for example by the heating conductors 5 extending out of the sleeve of the secondary hydraulic pipes 8.

The check valve 20 is for example a force fit in the barb 16. To continue to circulate, the windshield-washing liquid is therefore forced to pass through the check valve 20 at the level of the male connector 15.

In the dual manifold embodiment, the distribution device therefore includes four check valves 20, each check valve 20 being received in a respective barb 16 of a male connector 15.

In this embodiment, the check valves 20 are mounted as close as possible to the windshield wipers, which reduces the time for spraying the windshield-washing liquid onto the windshield of the motor vehicle. Moreover, a check valve 20 may also be received in the circulation channel 8a, 8b of each secondary hydraulic pipe 8, ensuring that the windshield-washing liquid does not return from one secondary hydraulic pipe 8 to the other one.

The invention is not limited to the embodiments described, the check valve 20 being receivable for example in the pump connector 9 connecting the windshield-washing liquid pump 12 to the main hydraulic pipe 7 or in the circulation channels of the main hydraulic pipe 7, at the inlet, on the same side as the pump 12, or in a barb of the branch connector 10.

The invention claimed is:

1. A windshield-washing liquid distribution device for motor vehicle windshield wipers, comprising:
    a hydraulic pipe having a circulation channel comprising:
        a main hydraulic pipe including at least one liquid circulation channel;
        two secondary hydraulic pipes, each secondary pipe including at least one liquid circulation channel;
    four hydraulic connectors for feeding liquid to said pipe or evacuating liquid from said pipe, the four hydraulic connectors comprising:
        a pump connector, connected to the main hydraulic pipe;
        an adapter, connected to one of the two secondary hydraulic pipes;
        a branch connector, connected between the main hydraulic pipe and the adapter; and
        a male liquid connector, connected to one of the two secondary hydraulic pipes; and
    at least one check valve,
    wherein the at least one check valve is received in the at least one liquid circulation channel.

2. The distribution device as claimed in claim 1, wherein said main hydraulic pipe is connected to a windshield-washing liquid pump of the motor vehicle and said secondary hydraulic pipes are connected to a respective windshield wiper.

3. The distribution device as claimed in claim 1, wherein the check valve is at least partly received in a barb of the one of the four hydraulic connectors, said barb being received in the at least one liquid circulation channel.

4. A windshield-washing liquid distribution device for motor vehicle windshield wipers, comprising:
    a hydraulic pipe including at least one liquid circulation channel;
    two or more hydraulic connectors for feeding liquid to said pipe or evacuating liquid from said pipe, the hydraulic connectors comprising an adapter and a male liquid connector, directly connected via a portion of the hydraulic pipe; and
    at least one check valve, wherein the check valve is inserted in a barb of the adapter, said barb being inserted in a circulation channel of a secondary hydraulic pipe, said adapter forming the at least one hydraulic connector for the connection of at least one branch connector with the circulation channel of the secondary hydraulic pipe.

5. A windshield-washing liquid distribution device for motor vehicle windshield wipers, comprising:
  a hydraulic pipe including at least one liquid circulation channel;
  two or more hydraulic connectors for feeding liquid to said pipe or evacuating liquid from said pipe, the hydraulic connectors comprising an adapter and a male liquid connector, directly connected via a portion of the hydraulic pipe; and
  at least one check valve,
  wherein the check valve is inserted at an inlet of a barb of the male liquid connector, said inlet of the barb being inserted in a circulation channel of a secondary hydraulic pipe, the male liquid connector forming the at least one hydraulic connector for the connection of a windshield wiper with at least one circulation channel of the secondary hydraulic pipe.

6. The distribution device as claimed in claim 1, wherein the check valve is inserted in the circulation channel, at an inlet of one of the two secondary hydraulic pipes, on a side intended to be connected to the branch connector connecting the circulation channels of the main hydraulic pipe to the circulation channels of the secondary hydraulic pipes.

7. The distribution device as claimed in claim 1, wherein the check valve is inserted in the circulation channel, at an outlet of one of the two secondary hydraulic pipes, on an upstream side of an end of the secondary hydraulic pipe intended to be connected to the male liquid connector connecting the circulation channel to a windshield wiper.

8. The distribution device as claimed in claim 1, wherein the at least one check valve is inserted in the circulation channel, at an outlet of the main hydraulic pipe, on a side intended to be connected to the branch connector connecting the circulation channels of the main hydraulic pipe to the circulation channels of the secondary hydraulic pipes.

9. The distribution device as claimed in claim 6, further comprising an immobilizing member cooperating with the circulation channel and the check valve to immobilize the check valve in the circulation channel.

10. The distribution device as claimed in claim 1, wherein the at least one check valve is of "duckbill" type.

11. The distribution device as claimed in claim 1, wherein the check valve is a force-fit in the circulation channel.

12. The distribution device as claimed in claim 1, wherein the main hydraulic pipe and/or the secondary hydraulic pipes include heating conductors.

13. The distribution device as claimed in claim 1, wherein the main hydraulic pipe and the secondary hydraulic pipes respectively include two liquid circulation channels.

14. The distribution device as claimed in claim 12, wherein the main hydraulic pipe and the secondary hydraulic pipes respectively include two liquid circulation channels, and wherein the heating conductors extend in a sleeve of the main or secondary hydraulic pipes and pass between the two liquid circulation channels of the main or secondary hydraulic pipes.

15. The distribution device as claimed in claim 4, wherein the at least one check valve is of "duckbill" type.

16. The distribution device as claimed in claim 4, wherein the check valve is a force-fit in the barb of the adapter.

17. The distribution device as claimed in claim 5, wherein the at least one check valve is of "duckbill" type.

18. The distribution device as claimed in claim 5, wherein the check valve is a force-fit in the inlet of the barb.

19. The distribution device as claimed in claim 4,
  wherein the hydraulic pipe including at least one liquid circulation channel comprises:
    a main hydraulic pipe including at least one circulation channel; and
    two secondary hydraulic pipes respectively including at least one circulation channel; and
  wherein the main hydraulic pipe and/or the secondary hydraulic pipes include heating conductors.

20. The distribution device as claimed in claim 19, wherein the heating conductors extend in a sleeve of the main or secondary hydraulic pipes and pass between the two of the circulation channels of the main or secondary hydraulic pipes.

21. The distribution device as claimed in claim 5, further comprising:
  wherein the hydraulic pipe including at least one liquid circulation channel comprises:
    a main hydraulic pipe including at least one circulation channel; and
    two secondary hydraulic pipes respectively including at least one circulation channel; and
  wherein the main hydraulic pipe and/or the secondary hydraulic pipes include heating conductors.

22. The distribution device as claimed in claim 21, wherein the heating conductors extend in a sleeve of the main or secondary hydraulic pipes and pass between the two of the circulation channels of the main or secondary hydraulic pipes.

* * * * *